United States Patent [19]

Hergenrother et al.

[11] Patent Number: 5,130,355

[45] Date of Patent: Jul. 14, 1992

[54] HALOALKOXYLATED POLYBUTADIENE POLYMER AND ROOFING MEMBRANE FORMED THEREFROM

[75] Inventors: William L. Hergenrother, Akron; James A. Davis, Uniontown, both of Ohio; Daniel R. McGillvary, Carmel, Ind.; Joseph K. Valaitis, Brecksville, Ohio

[73] Assignee: Bridgestone Corporation, Tokyo, Japan

[21] Appl. No.: 747,826

[22] Filed: Aug. 21, 1991

[51] Int. Cl.$^5$ ............................................. C08F 8/22
[52] U.S. Cl. ...................................... 524/71; 524/78; 524/413; 524/572; 525/332.3; 525/332.8; 525/332.9; 525/333.2; 525/356; 525/375
[58] Field of Search ................. 524/71, 78, 413, 572; 525/332.3, 332.8, 332.9, 333.2

[56] References Cited

U.S. PATENT DOCUMENTS 2,831,839 4/1938 Caterino et al. .
2,980,656 4/1961 Jones et al. .
3,293,226 12/1966 de Schrijver .
3,392,161 7/1968 Uelzmann .
3,480,609 11/1969 Frew, Jr. .
3,714,297 1/1973 Blaise et al. .
4,039,706 8/1977 Tajima et al. .
4,075,289 2/1978 Falk .
4,405,759 9/1983 Jagtap .
4,461,875 7/1984 Crepeau .
4,636,414 1/1987 Tajima et al. .
4,710,554 12/1987 Imai et al. .
4,762,744 1/1988 Woiceshyn et al. .
4,812,349 3/1989 Muelbeck .

*Primary Examiner*—Bernard Lipman
*Attorney, Agent, or Firm*—Frank J. Troy, Sr.

[57] ABSTRACT

A haloalkoxylated polybutadiene polymer and a composition containing the polymer which is suitable for use in a flat sheet material such as a roofing membrane is disclosed. The polymer has a superior filler capacity, excellent flame resistivity and acceptable heat aged tensile properties. The composition, which includes at least one polymer of the present invention and from about 5 to about 160 parts by weight of a filler material per 100 parts polymer, is self-adhering without the use of an adhesive and is heat seamable to produce seams which are resistant to temperatures as high as 100° C.

15 Claims, No Drawings

HALOALKOXYLATED POLYBUTADIENE POLYMER AND ROOFING MEMBRANE FORMED THEREFROM

FIELD OF THE INVENTION

The present invention relates generally to a novel polybutadiene polymer which is substituted with halogen atoms and alkoxy groups along its polymer chain. The present invention further relates to a composition and a heat-seamable, flat sheet material formed from the haloalkoxylated polybutadiene polymer and filler material.

BACKGROUND OF THE INVENTION

Traditionally, the building industry has utilized conventional built-up asphalt roofing as a preferred material in roofing construction. More recently, however, membrane roofing materials have displaced the conventional materials as a preferred material due to their cold cracking resistance, ease of installation, and overall improved and increased leak protection over time. Further, the membrane systems are easier and safer to install and are therefore more desirable to the contractor as well as the consumer.

Two membrane types are utilized in this field: elastomeric and thermoplastic. Elastomeric membranes, such as vulcanized EPDM, suffer the drawback of requiring an adhesive for seaming the membrane in order to provide a leak-free, continuous roofing cover. These adhesives add a significant material cost to the product and are also expensive, difficult and time-consuming to apply. Further, the adhesives often weaken over time, causing delamination of the membranes and subsequent leaks in the roofing cover. Elastomeric membranes also require an additional costly curing step.

Thermoplastic membranes, such as those formed from polyvinyl chloride (PVC), chlorinated polyethylene (CPE), chlorosulfonated polyethylene and the like, can be heat sealed or solvent welded to provide dependable seals of higher strength; however, these membranes also have serious disadvantages. For example, the thermoplastic material must be plasticized to provide the flexibility necessary for a roofing membrane. Unfortunately, plasticizers are quite expensive and often leach out of the membrane over time due to exposure to the environment. This loss of plasticizer results in the loss of flexibility, embrittlement and decreased cold crack resistance of the membrane, thereby severely shortening its useful life. Further, the capacity of the thermoplastic materials to accept fillers is somewhat limited. As fillers are usually desirable from an economic standpoint as well as advantageous in imparting properties such as flame retardancy, this disadvantage manifests itself in an expensive roofing product with severely limited fire retardancy or other desirable properties.

A strong need therefore exists for a polymer which exhibits the many characteristics necessary and essential for incorporation into a roofing membrane without exhibiting the drawbacks described above.

BRIEF SUMMARY OF THE INVENTION

An object of the present invention is to provide a polymer for use in a flat sheet material which is heat seamable and is useful to provide, for example, a roofing membrane or flashing material.

A further object of the present invention is to provide a polymer for use in a roofing membrane which accepts high filler loads.

Another object of the present invention is to provide a polymer for use in a roofing membrane which maintains its plasticity and flexibility over time.

Yet another object of the present invention is to provide a polymer for use in a roofing membrane which exhibits desirable weathering and heat aging properties.

Still another object of the present invention is to provide a composition which is fire retardant, heat seamable and which maintains its plasticity and flexibility over time.

These and other objectives are achieved by the haloalkoxylated polybutadiene polymer of the present invention as described in more detail below. The substituents attached to the polybutadiene backbone include halogens and alkoxys having an aliphatic group with a carbon chain length of between 6 and 18 carbon atoms. The composition of the present invention includes the haloalkoxylated polybutadiene polymer of the present invention and at least one filler material.

DETAILED DESCRIPTION OF THE PREFERRED EMBODIMENT

The polymer of the present invention is a polybutadiene, preferably 1,4-polybutadiene, which has been substituted at some or all of its ethylenic double bond locations with a substituent selected from the group consisting of:

(a) a halogen, preferably chlorine; and
(b) an alkoxy ($-OR_1$) wherein $R_1$ is an aliphatic group having a carbon chain length of between about 6 and about 18, inclusive.

The haloalkoxylated polybutadiene polymer of the present invention preferably comprises the following groups:

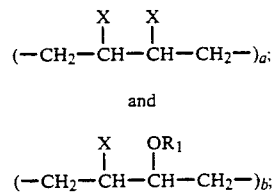

wherein
X is a halogen, preferably chlorine; and
$R_1$ is an aliphatic group having a carbon chain length of between about 6 and about 18 carbon atoms, inclusive, and preferably between 6 and 9, inclusive, carbon atoms; and
a = 0.05 to 0.95 mole fraction; and
b = 0.05 to 0.95 mole fraction; wherein a + b = 1.00.
Preferably,
a = 0.20 to 0.85 mole fraction; and
b = 0.15 to 0.80 mole fraction; wherein a + b = 1.00.

The polymer of the present invention preferably has a weight average molecular weight of about 200,000 to about 500,000 and an $\overline{M}_W/\overline{M}_N$ ratio of less than 3.0.

The base polymer material utilized in forming the polymer of the present invention is a polybutadiene polymer. The most preferred base polymer is 1,4-polybutadiene having a weight average molecular weight of between about 150,000 and 350,000 and an $\overline{M}_w/\overline{M}_N$ of about 1.00 to about 1.80, preferably about 1.00 to 1.50. The polybutadiene is preferably formed by the solution polymerization of butadiene in the presence of n-butyl lithium in a heated reaction system. The polybutadiene may be formed by other known methods, such as emulsion polymerization; however, other methods such as emulsion polymerization may result in a polymer having a more highly branched structure and which accepts lower filler loads. A suitable base polymer is commercially available as Diene ® 35 manufactured by Firestone Synthetic Rubber Company of Akron, Ohio.

In the production of the polymer of the present invention, the base polymer material is dissolved in a $CH_2Cl_2$ solvent mixture. The solvent mixture also includes an alcohol having a carbon chain length of between about 6 and about 18 carbon atoms, inclusive. This solution is then treated with a halogen at a temperature of between about $-10°$ C. and $+10°$ C. Air is added to dilute the halogen and stop the radical chain addition of the halogen to the polymer. The resulting polymer is then isolated by any conventional method, such as alcohol coagulation.

While not intended to be limiting, the following examples are illustrative of preparation of polymers of the instant invention:

Example 1

1,4-polybutadiene was prepared by reacting 24.98 pounds of 24.0 weight percent butadiene and 11.4 cc of 1.50 M n-butyl lithium for about 16 hours at 49° C. The polymerization was then stopped with isopropanol and the solvent was removed by drying. Analysis of the polymer by I.R. showed 37% cis, 54% trans and 9% vinyl microstructure. GPC in tetrahydrofuran showed an $\overline{M}_N$ of 237,600 g/mole with an $\overline{M}_W/\overline{M}_N$ ratio of 1.38.

A solution was then prepared by dissolving 50 grams of the polymer in 500 ml of $CH_2Cl_2$. This solution was added to a 5 liter, 3-neck flask which had painted black and which was equipped with a stirrer, a fritted glass inlet tube and a condenser. An additional 1300 ml $CH_2Cl_2$ was added to bring the total volume to 1800 ml. To this solution was added 384 ml of 1-hexanol (313 g, 3.069 mole) while cooling in an ice bath.

After the solution was cooled to 0° C., 70 g (1.058 mole) $Cl_2$ was liquified in a 100 ml flask. The flask was attached to the reactor such that as the chlorine evaporated, it was diluted with air used to stop radical chain addition of $Cl_2$ to the polymer and added through the fritted glass inlet tube slowly over 1.5 hours. The resulting polymer was then separated by alcohol coagulation, washed, dried and milled.

EXAMPLE 2

The reaction described in Example 1 was duplicated except for a substitution of 484 ml of octanol (400 g, 3.069 mole) for the hexanol utilized in the previous example.

NMR $^{13}$C spectral analysis of the resulting polymer products from Examples 1 and 2 revealed the results set forth in Table 1 below:

TABLE 1

| Analysis of Substituted Polybutadiene Polymers | | |
|---|---|---|
| | Example 1 (Hexanol, $R_1 = C_6H_{13}$) | Example 2 (Octanol, $R_1 = C_8H_{17}$) |
| Yield (grams) | 141.5 | 140.0 |
| Cl Cl<br>\| \|<br>$(-CH_2-CH-CH-CH_2-)$ | 0.578 | 0.666 |
| (mole fraction) | | |
| Cl OR$_1$<br>\| \|<br>$(-CH_2-CH-CH-CH_2-)$ | 0.422 | 0.334 |
| (mole fraction) | | |
| $\overline{M}_N$ (g/mole) | 234,000 | 213,000 |
| $\overline{M}_W/\overline{M}_N$ | 2.46 | 2.15 |

The polymer of the preset invention may be combined with a filler material to form a composition suitable for use in forming a heat-seamable, flat sheet material such a s a roofing membrane. the composition may include from about 5 parts to about 160 parts of the filler material based on 100 parts polymer.

The composition of the present invention includes a polymer component having at least one polymer of the present invention. The polymer component of the composition may therefore include a single haloalkoxylated polybutadiene or blends of two or more haloalkoxylated polybutadienes. Preferably, the polymer component of the composition includes at least one haloalkoxylated polybutadiene wherein $R_1$ as described above is an aliphatic group having a carbon chain length of between 6 and 9 carbon atoms, inclusive. If the polymer component includes a blend of two or more polymers of the present invention, any blending ratios or proportions may be utilized.

The filler material may be any conventional filler material, including (but not limited to) titanium dioxide, various grades of carbon black, finely ground coal, finely ground mollusk shells, calcium carbonate, silicates, untreated or chemically modified clays, mica, talc, silica, and mixtures thereof. Fillers which impart flame retardancy to the membrane, including antimony trioxide, zinc borate, alumina trihydrate and the like may also be added. The carbon black useful herein is any carbon black. Preferred are furnace blacks such as GPF (general purpose furnace), FEF (fast extrusion furnace) and SRF (semi-reinforcing furnace). These carbon blacks may also be blended with more reinforcing blacks, i.e., HAF, ISAF, SAF and the like. For a complete description of such carbon blacks, see for example, *The Vanderbilt Rubber Handbook*, pp. 408-424, RT Vanderbilt Co., Norwalk, Conn. 06855 (1979 edition). Preferably, the composition of the present invention includes from about 50 parts to about 135 parts filler based on 100 parts polymer. The preferred filler is titanium dioxide.

The composition of the present invention may also contain an effective amount of conventional compounding additives, such as processing aids, UV stabilizers, dispersing agents, flame retardants, and the like. The preferred composition includes 0.25 to 2.5 parts per hundred parts polymer of a fatty acid salt/amide blend commercially available from Struktol Company under the trademark Polydis ® TR-016 as a dispersing agent and from 1 to 5 parts per hundred parts polymer of a substituted benzotriazole commercially available from Ciba-Giegy under the trademark TINUVIN ® 327.

While not intended to be limiting, the following examples are illustrative of the composition of the present invention.

EXAMPLE 3

The polymer formed in Example 1 was milled with 125 parts rutile titanium dioxide (TI-PURE® R-960 available from DuPont) 2.5 parts TINUVIN® 327 and 0.5 parts POLYDIS® TR-016. This composition was designated Composition A. The milling produced 45 mil flat sheets. For testing purposes, dumbbell shaped specimens were cut from individual 45 mil flat sheets according to ASTM D-412 (Method A-dumbbell and straight specimens). Modulus, tensile strength at break and elongation at break measurements were obtained using a table model Instron® Tester, Model 1130, and the test results were calculated in accordance with ASTM D-412. All dumbbell specimens were allowed to set for about 24 hours, following which testing was carried out at 23° C.. Shore A hardness testing was conducted at 23° C. in accordance with ASTM Method D-2240.

Tear properties of milled 45 mil flat rubber sheets cut with a die C (90° angle die) were determined in accordance with ASTM Method D-624. Die C tear specimens were not nicked prior to testing. Tear resistance, in lbf/inch, was obtained using a table model Instron® Tester, Model 1130 and the test results were calculated in accordance with ASTM Method D-624. Testing was again carried out at 23° C.

Oxygen index testing was conducted in accordance with ASTM Method D-2863 using a Stanton-Redcroft FTA flammability unit.

A battery of control tests was performed on similarly produced, 45 mil specimens prepared from a composition commercially available as a roof sheeting material from Sarna Kunststoff AG of Switzerland as SARNAFIL® PVC.

The results of these tests are set forth in Table 2 below.

EXAMPLE 4

The polymer formed in Example 2 was filled with 125 parts rutile titanium dioxide available from DuPont under the trademark TI-PURE® R-960, 2.5 parts TINUVIN® 327 and 0.5 part POLYDIS®TR-016, based on 100 parts polymer, to form a polymer composition of the present invention. This composition was designated Composition b. A battery of tests were conducted to determine a number of physical properties for the rubbery composition utilizing the procedures set forth in Example 3.

The results of the tests described in Examples 3 and 4 are tabulated in Table 2 below.

TABLE 2

| Properties at 23° C. - Unaged Physical Properties | | | |
|---|---|---|---|
| | Control Composition (filled PVC polymer) | Comp. A | Comp. B |
| 100% Modulus, psi | 1145 | 500 | 720 |
| 200% Modulus, psi | 1575 | 720 | 1135 |
| 300% Modulus, psi | — | 1025 | 1330 |
| Tensile at break, psi | 1585 | 1220 | 1395 |
| Elongation at break, % | 205 | 355 | 320 |
| Tear at 23° C., | 370 | 223 | 265 |

TABLE 2-continued

| Properties at 23° C. - Unaged Physical Properties | | | |
|---|---|---|---|
| | Control Composition (filled PVC polymer) | Comp. A | Comp. B |
| lbf/in. | | | |
| Shore A Hardness (at 23° C., unaged specimens) | 76 | 75 | 78 |
| L.O.I. Oxygen Index, % O$_2$ | 26 | 27 | 27 |

EXAMPLE 5

Dumbbell specimens cut in accordance with ASTM D-412 were aged in a forced air oven for 28 days at 70° C. in accordance with ASTM D-573. Stress-strain tests as set forth in Example 3 were performed on the oven aged samples. A 45 mil sample of a mineral-filled PVC control composition available as SARNAFIL® PVC was oven aged and also tested at 23° C. The results of these tests are set forth in Table 3 below.

TABLE 3

| Properties at 23° C. - Aged Dumbbell Specimens | | | |
|---|---|---|---|
| | Control Composition (filled PVC polymer) | Composition A | Composition B |
| Tensile at break, psi | 1705 | 2775 | 2650 |
| Retention, % | 107.6 | 277.5 | 189.9 |
| Elongation at break, % | 165 | 8 | 9 |

As can be seen from the above data, the compositions of the present invention exhibit higher mineral filler loadings, equivalent to directionally better L.O.I. performance and significantly better tensile strength at break than the mineral filled PVC compositions.

EXAMPLE 6

A test for seam peel and shear adhesion was conducted as described below. A composition including 50 parts of the polymer of Example 1 and 50 parts o the polymer of Example 2 filled with 125 parts rutile titanium dioxide, 2.5 parts TINUVIN® 327 and 0.5 parts POLYDIS® TR-016, designated Composition C, was milled into 6×6-inch rubber sheets, approximately 40 mils in thickness. Scrim-reinforced test pads were formed by inserting a 6×6-inch piece of PVC-coated polyester scrim between two of the above 40 mil rubber sheets, covering the rubber/scrim assembly with Mylar® film, placing the covered assembly in a curing mold, pressing the Mylar® covered assembly for about five minutes at about 150° C., removing the Mylar® film once the scrim-reinforced rubber test pad has cooled to 23° C. and heat seaming the assembly using a Leister hand-held heating gun. One-inch wide test samples were prepared for seam peel and shear adhesion testing using a one-inch wide die and a clicker machine. The test samples were tested at a crosshead and chart speed of two inches per minute using a Model 1130 Instron Universal Tester in accordance with the adhesion test set forth in ASTM D-413. Seam peel and shear strengths were measured at room temperature (23° C.) as well as 70° C. and 100° C.

Control test samples using a sulfur cured conventional black EPDM membrane were seamed using a butyl-based lap splice adhesive commercially available from Uniroyal as SA-1065 were also tested. The control test membrane was a sulfur cured, black EPDM membrane which is commercially available from Firestone Building Products Company and marketed as a RUBBERGARD® roofing membrane. The results of these tests are set forth in Tables 4 and 5 below.

TABLE 4

| | Seam Interply Peel Adhesion | | | | | |
|---|---|---|---|---|---|---|
| | PLI* at 23° C. | Type of Failure | PLI at 70° C. | Type of Failure | PLI at 100° C. | Type of Failure |
| Adhesive-Seamed Control | 13 | c | 1.2 | c | 0.85 | c |
| Composition C | >81 | a | >49 | a | >29.5 | a |

*Pounds per linear inch

TABLE 5

| | Seam Shear Strength Adhesion | | | | | |
|---|---|---|---|---|---|---|
| | PSI* at 23° C. | Type of Failure | PSI at 70° C. | Type of Failure | PSI at 100° C. | Type of Failure |
| Adhesive-Seamed Control | 27 | c | 11.5 | c | 7.75 | c |
| Composition C | >116 | a | >68 | a | >38.5 | a |

*Pounds per square inch
Code Description - Type of Failure
a - Rubber compound tore to the fabric reinforcement, rubber separated from the fabric
b - Some initial interply failure, then rubber compound tore to the fabric reinforcement, rubber separated from the fabric
c - Interply failure - separation between the two plies In order to demonstrate the seaming ability of the substituted polybutadiene polymer in a mineral filled membrane composition, both peel and shear test specimens were formed using a hand-held heating gun with a heat setting of 10 (peak hot air temperature, 450° C.). The seam was formed during the heating process using a metal hand roller and from about 6 to about 8 psi seaming pressure. The hand-held heating gun was manufactured by Leister-Kombi in Switzerland.

As these results indicate, the compositions of the present invention are superior to conventional adhesive-seamed, sulfur cured EPDM membranes in both interply peel adhesion and seam shear strength at room temperature as well as elevated temperatures of 70° C. and 100° C.

In view of the properties described above, the compositions of the present invention are valuable in the production of roofing membranes. Roofing membranes formed from the compositions of the present invention may be produced by any method conventionally used for producing roofing membranes from filled polymer compositions. For example, the membranes may be formed by a conventional calendering technique. Other methods, including spray coating and roller die forming may also be used. Roofing membranes formed from the compositions of the present invention may optionally be scrim reinforced.

The embodiments and examples set forth previously are provided to illustrate the spirit and scope of the present invention. It is to be understood that one of ordinary skill in the art can contemplate and make various changes and modifications that do not depart from the spirit and scope of the present invention. For example, other halogens, including bromine and fluorine, as well as higher alcohols may be utilized in forming the polymer of the present invention. Further, other additives and agents conventionally utilized in preparing roofing membranes may be utilized in the composition of the present invention. Also, the heat-seamable, flat sheet materials of the present invention may be utilized in other areas as well as roofing construction.

What is claimed is:

1. A substituted polybutadiene comprising the following groups:

$$(-CH_2-\underset{|}{\overset{X}{C}H}-\underset{|}{\overset{X}{C}H}-CH_2-)_a; \text{ and} \quad (a)$$

$$(-CH_2-\underset{|}{\overset{X}{C}H}-\underset{|}{\overset{OR_1}{C}H}-CH_2-)_b; \quad (b)$$

wherein
X is a halogen; and
$R_1$ is an aliphatic group having a carbon chain length of between 6 and 18 carbon atoms, inclusive; and
a = 0.05 to 0.95 mole fraction;
b = 0.05 to 0.95 mole fraction; and a+b = 1.00.

2. A substituted polybutadiene in accordance with claim 1 wherein said polybutadiene is a 1,4-polybutadiene formed by solution polymerization and having a $\overline{M}_W/\overline{M}_N$ of 1.00 to 1.80.

3. A substituted polybutadiene in accordance with claim 2 wherein said polybutadiene is 1,4-polybutadiene formed by solution polymerization and having an $\overline{M}_W/\overline{M}_N$ of 1.00 to 1.50.

4. A substituted polybutadiene in accordance with claim 3 wherein
a = 0.20 to 0.85 mole fraction;
b = 0.15 to 0.80 mole fraction; and a+b = 1.00.

5. A substituted polybutadiene in accordance with claim 4 wherein $R_1$ is an aliphatic group having a carbon chain length of between 6 and 9 carbon atoms and wherein X is chlorine.

6. A composition comprising:
(a) a polymer component comprising at least one substituted polybutadiene, said polybutadiene comprising the following groups:

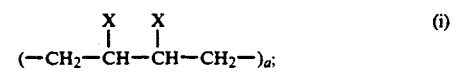

and

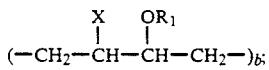 (ii)

wherein

X is a halogen; and

R₁ is an aliphatic group having a carbon chain length of between 6 and 18 carbon atoms, inclusive; and a = 0.05 to 9.95 mole fraction;

b = 0.05 to 0.95 mole fraction; and a+b=1.0; and (b) from 5 to 160 parts by weight of a filler material per 100 parts polymer.

7. A composition in accordance with claim 6 wherein
a = 0.20 to 0.85 mole fraction;
b = 0.15 to 0.80 mole fraction; and a+b=1.00.

8. A composition in accordance with claim 7 wherein R₁ is an aliphatic group having a carbon chain length of between 6 and 9 carbon atoms and X is chlorine.

9. A composition in accordance with claim 8 wherein said filler material is between 50 and 135 parts by weight per 100 parts polymer.

10. A composition in accordance with claim 9 wherein said filler is selected from the group consisting of titanium dioxide, carbon black, ground coal, ground mollusk shells, calcium carbonate, mica, talc and silica or mixtures thereof.

11. A composition in accordance with claim 10 wherein said filler is titanium dioxide.

12. A heat-seamable, flat sheet material comprising:

(a) a polymer component comprising at least one substituted polybutadiene, said polybutadiene comprising the following groups:

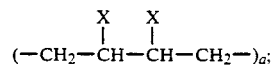 (i)

and

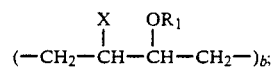 (ii)

wherein

X is a halogen; and

R₁ is an aliphatic group having a carbon chain length of between 6 and 18 carbon atoms, inclusive; and a = 0.05 to 9.95 mole fraction;

b = 0.05 to 9.95 mole fraction; a+b=1.00; and (b) from 5 to 160 parts by weight of a filler material per 100 parts polymer.

13. A material in accordance with claim 12 wherein said material is a roofing membrane.

14. A process for forming the polymer of claim 1 comprising:

(a) providing a base polymer of polybutadiene having a weight average molecular weight of between about 150,000 and 350,000 and an $\overline{M}_W/\overline{M}_N$ of about 1.00 to about 1.80;

(b) dissolving said polymer in a solvent mixture, said mixture including an alcohol having a carbon chain length of between about 6 and about 18 carbon atoms, inclusive, thereby forming a polymer solution;

(c) treating said polymer solution with a halogen; and (d) supplying air to act as a diluent and to stop the radical chain addition of said halogen to said polymer.

15. A process in accordance with claim 14 further comprising forming said base polymer by solution polymerization in the presence of n-butyl lithium in a heated reaction system.

* * * * *